(12) United States Patent
Winzer et al.

(10) Patent No.: US 8,503,845 B2
(45) Date of Patent: Aug. 6, 2013

(54) MULTI-CORE OPTICAL FIBER AND OPTICAL COMMUNICATION SYSTEMS

(75) Inventors: Peter J. Winzer, Aberdeen, NJ (US); Christopher Richard Doerr, Middletown, NJ (US)

(73) Assignee: Alcatel Lucent, Paris (FR)

( * ) Notice: Subject to any disclaimer, the term of this patent is extended or adjusted under 35 U.S.C. 154(b) by 213 days.

(21) Appl. No.: 13/076,917

(22) Filed: Mar. 31, 2011

(65) Prior Publication Data
US 2012/0183304 A1 Jul. 19, 2012

Related U.S. Application Data

(60) Provisional application No. 61/433,437, filed on Jan. 17, 2011, provisional application No. 61/464,476, filed on Mar. 5, 2011.

(51) Int. Cl.
*G02B 6/02* (2006.01)

(52) U.S. Cl.
USPC ............... 385/123; 385/27; 385/28; 385/122; 385/124; 385/125; 385/126; 385/127; 385/128

(58) Field of Classification Search
USPC ....................................... 385/27–28, 122–128
See application file for complete search history.

(56) References Cited

U.S. PATENT DOCUMENTS

| | | | | |
|---|---|---|---|---|
| 6,160,943 A * | 12/2000 | Davis et al. | | 385/126 |
| 6,381,045 B1 | 4/2002 | DiGiovanni et al. | | |
| 6,535,678 B1 * | 3/2003 | Yamauchi et al. | | 385/123 |
| 6,775,449 B2 * | 8/2004 | White | | 385/123 |
| 7,082,242 B2 * | 7/2006 | Fajardo et al. | | 385/127 |
| 7,317,857 B2 * | 1/2008 | Manyam et al. | | 385/127 |
| 7,424,195 B2 * | 9/2008 | Andrieu et al. | | 385/126 |
| 2008/0107386 A1 | 5/2008 | Kudou et al. | | |
| 2008/0142828 A1 | 6/2008 | Yang | | |
| 2010/0054742 A1 | 3/2010 | Imamura | | |
| 2010/0329670 A1 | 12/2010 | Essiambre | | |
| 2010/0329671 A1 | 12/2010 | Essiambre | | |

OTHER PUBLICATIONS

Chen, Xia et al., "Polarization-Independent Grating Couplers for Silicon-on-Insulator Nanophotonic Waveguides", Optics Letters, Feb. 8, 2011, 4 pages.
Mekis, Attila, et al., "A Grating-Coupler-Enabled CMOS Photonics Platform", IEEE Journal of Selected Topics in Quantum Electronics, vol. 17, No. 3, Nov. 29, 2010, 12 pages.
Gloge, D. et al., "Impulse Response of Fibers With Ring-Shaped Parabolic Index Distribution", Bell System Tech. J., vol. 52, No. 7, Sep. 1973, pp. 1161-1168.
Kogelnik, H., "Theory of Optical Waveguides", Guided-Wave Optoelectronics, Springer-Verlag, Berlin, 1990, pp. 12-17.
Lee, B. G. et al., "120-Gb/s 100-m Transmission in a Single Multicore Multimode Fiber Containing Six Cores Interfaced with a Matching VCSEL Array", Photonics Society Summer Topical Meeting Series, Jul. 19-21, 2010 IEEE, TuD4.4, 16.30-16.45, pp. 223-224.

(Continued)

*Primary Examiner* — Brian Healy
*Assistant Examiner* — Guy Anderson
(74) *Attorney, Agent, or Firm* — John F. McCabe (57) ABSTRACT

An apparatus includes an optical fiber having a plurality of optical cores therein. Each optical core is located lateral in the optical fiber to the remaining one or more optical cores and is able to support a number of propagating optical modes at telecommunications wavelengths. Each number is less than seventy.

19 Claims, 5 Drawing Sheets

(56) References Cited

OTHER PUBLICATIONS

Doerr, Christopher Richard, U.S. Appl. No. 13/077,149, filed Mar. 31, 2011, "Optical Fibers With Tubular Optical Cores", 36 pages.
Doerr, Christopher R., U.S. Appl. No. 13/041,366, filed Mar. 5, 2011, "Radial Optical Coupler," 44 pages.
Doerr, Christopher R., U.S. Appl. No. 13/041,364, filed Mar. 5, 2011, "Polarization-Independent Grating Optical Coupler," 40 pages.
Ryf, R. et al., "Space-division multiplexing over 10 km of three-mode fiber using coherent 6×6 MIMO processing", Optical Fiber Communication Conference (OFC), Post deadline paper PDPB10, Mar. 8, 2011, OSA/OFC/NFOEC 2011, 3 pgs.
Doerr, Christopher R. et al., "Circular grating coupler for creating focused azimuthally and radially polarized beams". Optics Letters, vol. 36, No. 7, Apr. 1, 2011, pp. 1209-1211.
Dorn, R. et al., "Sharper Focus for a Radially Polarized Light Beam", Physical Review Letters, vol. 91, No. 23, Dec. 5, 2003, pp. 233901-1-233901-4.
Gupta, Devki Nandan, et al., "Electron Acceleration to GeV energy by a radially polarized laser", Physics Letters A, 368, 2007, pp. 402-407.
Ibanescu, M., et al., "An All-Dielectric Coaxial Waveguide", Science, vol. 289, Jul. 21, 2000, pp. 415-419.
Kogelnik, H., et al, "Laser Beams and Resonators", Proceedings of the IEEE, vol. 54, No. 10, Oct. 1966, pp. 1312-1329.
Passilly, Nicolas, et al, "Simple interferometric technique for generation of a radially polarized light beam", J. Opt. Soc. Am. A, vol. 22, No. 5, May 2005, pp. 984-991.
Mushiake, Y., et al, "Generation of Radially Polarized Optical Beam Mode by Laser Oscillation", Proceedings of the IEEE, 60, Sep. 1972, pp. 1107-1109.
Jordan, Rebecca H., et al, "Lasing behavior of circular grating surface-emitting semiconductor lasers", J. Opt. Soc. Am. B, vol. 14, No. 2, Feb. 1997, pp. 449-453.
Miyai, E., et al, "Lasers producing tailored beams", Nature, vol. 441, Jun. 22, 2006, p. 946.
Noda, Susumu, et al, "Polarization Mode Control of Two-Dimensional Photonic Crystal Laser by Unit Cell Structure Design", Science, vol. 293, Aug. 10, 2001, pp. 1123-1125.
Doerr, Christopher R., "360 Star Coupler for Detecting Subwavelength Features", IEEE Photonics Technology Letters, vol. 20, No. 17, Sep. 1, 2008, pp. 1440-1442.
Dragone, C., "Optimum design of a planar array of tapered waveguides", J. Opt. Soc. Am. A, vol. 7, No. 11, Nov. 1990, pp. 2081-2093.
Curtis, Jennifer E., et al., "Dynamic Holographic Optical Tweezers", Opt. Commun., 207, Apr. 17, 2002, p. 169 et seq.
Kitamura, Kyoko, et al, "Sub-wavelength focal spot with long depth of focus generated by radially polarized, narrow-width annular beam", Optics Express, vol. 18, No. 5, Mar. 1, 2010, pp. 4518-4525.
Zurita-Sanchez, Jorge R., et al, "Multipolar interband absorption in a semiconductor quantum dot. II. Magnetic dipole enhancement", J. Opt. Soc. Am. B, vol. 19, No. 11, Nov. 2002, pp. 2722-2726.
Loudon, R., The Quantum Theory of Light (Oxford University, 1973), Chapter 8, pp. 172-173.
Doerr, Christopher R., et al, U.S. Appl. No. 13/012,712, filed Jan. 24, 2011, "Core-Selective Optical Switches," 46 pages.
Essiambre, Rene-Jean, et al, U.S. Appl. No. 12/827,641, filed Jun. 30, 2010, "Multimode-Optical Communication", 46 pages.
Dragone, C., "Efficient N×N Star Coupler Based on Fourier Optics", Electronics Letters, vol. 24, No. 15, Jul. 1988, pp. 942-944.
Whitesides, George M., "The origins and the future of microfluidics", Nature, vol. 442, Jul. 27, 2006, pp. 368-373.
Zurita-Sanchez, Jorge R., et al, "Multipolar interband absorption in a semiconductor quantum dot. I. Electric quadrupole enhancement", J. Opt. Soc. Am. B, vol. 19, No. 6, Jun. 2002, pp. 1355-1362.
PCT International Search Report, PCT/US2012/020447, International Filing Date Jan. 6, 2012, Date of Mailing Aug. 30, 2012.

* cited by examiner

MULTI-CORE OPTICAL FIBER AND OPTICAL COMMUNICATION SYSTEMS

This application claims the benefit of U.S. provisional application 61/433,437, which was filed on Jan. 17, 2011, and U.S. provisional application 61/464,476, which was filed on Mar. 5, 2011.

BACKGROUND

1. Technical Field

The invention relates to multi-core optical fibers and to optical communication systems using multi-core optical fibers.

2. Related Art

This section introduces aspects that may be helpful to facilitating a better understanding of the inventions. Accordingly, the statements of this section are to be read in this light and are not to be understood as admissions about what is in the prior art or what is not in the prior art.

Many optical communication systems include a series of one or more spans of optical fiber that transport data-modulated optical carriers between an optical transmitter and an optical receiver. The optical fiber may be a single-mode optical fiber or a multi-mode optical fiber. While a single-mode optical fiber supports only a single propagating optical spatial mode per wavelength channel, a multi-mode optical fiber supports a plurality of orthogonal propagating optical spatial modes per wavelength channel. For that reason, a multi-mode optical fiber can transmit multiple optical data streams per wavelength channel, in parallel, i.e., over the plurality of propagating optical spatial and polarization modes. Recently, efforts have been made to develop optical communication systems based on multi-mode optical transmission fibers because of the hope that their multiple propagating optical modes would enable an increase in total data transmission rate.

SUMMARY

A first embodiment of an apparatus includes an optical fiber having a plurality of optical cores therein. In the optical fiber, each optical core is located lateral to the remaining one or more optical cores, and each optical core is able to support a number of propagating optical modes at telecommunications wavelengths. Each such number is less than or equal to fifty or is at least less than or equal to seventy.

In some of the first embodiments, each such number may be less than or equal to thirty and greater than or equal to five. In some such specific embodiments, each number may be less than or equal to twenty.

In any of the first embodiments, each number may be greater than or equal to five.

In any of the first embodiments, optical cross-talk between the optical cores may be insubstantial over the length of the optical fiber.

In any of the first embodiments, an average lateral separation of the optical cores may be, at least, as large as thirty, thirty-five, or forty micro-meters and may be 80 micro-meters or more. In some such first embodiments, each number may be greater than or equal to five and less than or equal to thirty.

In any of the first embodiments, one or more of the optical cores of the plurality of optical cores may be a tubular optical core. In some such embodiments, the tubular optical core(s) may be multi-mode optical core(s) at a wavelength in one of the C band, the L band, and the S band of optical telecommunications.

A second embodiment of an apparatus includes an optical communication device and a sequence of one or more spans of optical fiber. The optical communication device has an optical transmitter with a plurality of optical data modulators and/or has an optical receiver with a plurality of optical data demodulators. The sequence is optically connected at one end to the optical transmitter or receiver. Each optical fiber of the sequence has three or more optical cores. Each optical core is able to support a number of propagating optical modes at telecommunications wavelengths, and each such number is less than or equal to fifty or is at least less than or equal to seventy.

In some of the second embodiments, each optical data modulator or data demodulator may connect to a corresponding one of the optical cores. In some such second embodiments, each optical data modulator or data demodulator may be configured to communicate, in parallel, via a plurality of different sets of the propagating optical modes of the corresponding one of the optical cores.

In any of the second embodiments, the communication device may be configured to compensate for optical crosstalk on the individual optical cores without compensating for optical crosstalk between different ones of the optical cores.

In any of the second embodiments, each number may be less than or equal to thirty and greater than or equal to five.

In any of the second embodiments, optical cross-talk between the optical cores may be insubstantial over the length of the optical fiber.

In any of the second embodiments, an average lateral separation of the optical cores is at least as large as thirty or thirty-five micro-meters. In some such embodiments, each number may be greater than or equal to five and less than or equal to thirty.

In any of the second embodiments, one or more of the three or more optical cores may be a tubular optical core. In some such embodiments, the tubular optical core(s) may be multi-mode optical core(s) at a wavelength in one of the C band, the L band, and the S band of optical telecommunications.

DETAILED DESCRIPTION OF ILLUSTRATIVE EMBODIMENTS

Herein, telecommunication wavelengths refer to wavelengths in the optical telecommunications C, L, and S bands.

Figure 1:
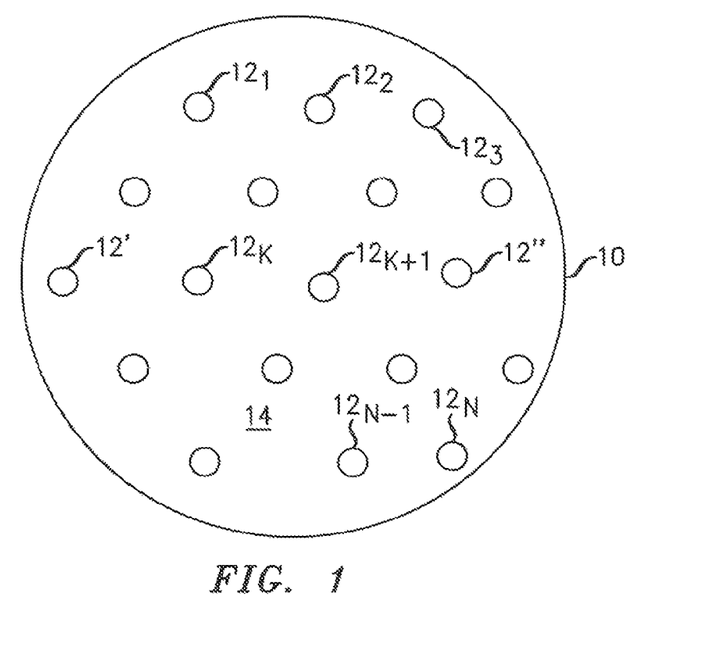
FIG. 1 is a cross-sectional view schematically illustrating a multi-core optical fiber in which a plurality of the optical cores are multi-mode.

FIG. 1 illustrates an optical fiber 10 that has, at least, N optical cores $12_1$-$12_N$ and an optical cladding 14 that forms an optical matrix in which the N optical cores $12_1$-$12_N$ are located. Here, the integer N is greater that one, e.g., N may be 3 or more, 5 or more, or even 10 or more. Indeed, N can be scaled to larger values so that the optical fiber 10 will support more parallel optical communication channels per wavelength channel. The optical cladding 14 has a smaller refractive index than the optical cores $12_1$-$12_N$ at telecommunication wavelengths. For that reason, the individual optical cores $12_1$-$12_N$ guide light at telecommunication wavelengths.

Each optical core $12_k$ is able to support a small to moderate number of relatively orthogonal propagating optical modes, e.g., LP-type modes; other optical waveguide modes such as HE, EH, TE, or TM modes; or linear combinations thereof. For each optical core $12_k$, the number of such modes, e.g., is usually less than or equal to 70, is often less than or equal to 50, and may even be less than or equal to 30 or 20. For each optical core $12_k$, the number of such modes is also typically not very small, e.g., the number may be greater than or equal to 5 or greater than or equal to 10.

In some embodiments of the optical fiber 10, each optical core $12_1$-$12_N$ is configured to support the same number M of orthogonal propagating optical modes.

In other embodiments of the optical fiber 10, different ones of the optical cores $12_1$-$12_N$ may be configured to support different numbers of orthogonal propagating optical modes.

Typically, the optical cores $12_1$-$12_N$ are relatively widely laterally separated in the optical cladding 14. For example, the average or minimum lateral separations, e.g., the core-to-core pitch may be about 30 micro-meters or more, about 35 micro-meters or more, about 40 micro-meters or more, or even about 80 micro-meters or more. The average or minimal lateral separation between any pair of optical cores $12_1$-$12_N$ is typically large enough to ensure that the optical crosstalk between different ones of the optical cores $12_1$-$12_N$ is insubstantial or negligible even over the entire length of the optical fiber 10 and is preferably large enough to ensure that such optical cross talk is insubstantial or negligible over the length of an optical communication link including multiple segments of the optical fiber 10. For example, the optical crosstalk power between a pair of the optical cores $12_1$-$12_N$ may be, at least, one, two, or more orders of magnitude smaller than the optical crosstalk power between any pair of propagating optical modes on a single one of the same pair of the optical cores $12_1$-$12_N$.

In some embodiments, the optical fiber 10 may also include one or more single-mode optical cores 12', 12" within the optical cladding 14. Such single-mode optical cores should also be laterally separated from the multimode optical cores $12_1$-$12_N$ so that optical crosstalk therebetween is insubstantial or negligible.

In the optical fiber 10, crosstalk between pairs of the optical cores $12_1$-$12_N$ is typically so much smaller than optical crosstalk between propagating optical modes in the same optical core $12_1$-$12_N$ that the inter-core optical crosstalk can be ignored. Thus, the optical fiber 10 provides a matrix for physically holding the N optical cores $12_1$-$12_N$, but the matrix does cause significant interference or crosstalk between data streams being transmitted on different ones of the optical cores $12_1$-$12_N$.

In the optical fiber 10, an individual optical core $12_k$ will typically produce substantial optical crosstalk between its different propagating optical modes. Thus, the parallel transmission of multiple modulated optical carriers to the same optical core $12_k$ will typically suffer from intra-core crosstalk. Indeed, precoding or post-decoding may be used to beneficially compensate for or remove such intra-core crosstalk. For example, the light signal received from each optical core $12_k$ may be digitally processed after detection to effectively diagonalize the optical core's channel matrix thereby removing or reducing intra-core crosstalk. Such pre-transmission or post-reception processing may be simpler and require less hardware when inter-core crosstalk can be ignored, because the channel matrices can be separately diagonalized or pre-compensated on a per-optical core basis.

For the above reasons, the above design of the optical fiber 10 can provide easier scalability of data communication rates. In particular, the lack of a need to significantly consider inter-core crosstalk typically implies that the precoding hardware of an optical transmitter or the equalization and/or demodulation hardware of an optical receiver would typically not need to become more complex on a per-optical core basis as the number of optical cores $12_1$-$12_N$ is increased in the multi-core optical fiber. In addition, the size and processing delay for such hardware, on a per-optical core basis, can also typically be kept small by constructing the individual optical cores $12_1$-$12_N$ to support only a moderate or small number of propagating optical modes therein. For example, a small number of propagating modes in an optical core typically reduces the propagation delay between different modes therein, which enables a smaller length equalizer to remove interference between received light from the different propagation modes of the same core in an optical receiver.

Referring again to FIG. 1, some embodiments of the optical fiber 10 are constructed so that the optical cores $12_1$-$12_N$ have a special lateral distribution. For example, the optical cores $12_1$-$12_N$ may be laterally distributed at the nodes of a regular two-dimensional (2D) lattice, e.g., at the nodes of a hexagonal lattice. Such special lateral distributions of the optical cores $12_1$-$12_N$ may simplify the fabrication and/or use of the optical fiber 10. For example, the optical cores $12_1$-$12_N$ may be located at the nodes of such a regular 2D lattice by a simple fabrication technique in which the optical fiber 10 is formed by close-packing single optical core glass preforms and then, drawing a multi-core optical fiber 10 there from. Also, forming the optical cores $12_1$-$12_N$ at the nodes of such a regular 2D lattice may simplify connecting optical modulators and optical demodulators to corresponding ones of the optical cores $12_1$-$12_N$. The choice of a particular lattice geometry may also be motivated by a trade off between manufacturing expense and/or complexity, e.g., as related to the outer fiber diameter, and performance, e.g., as defined by the amount of inter-core crosstalk generated.

Figure 2:
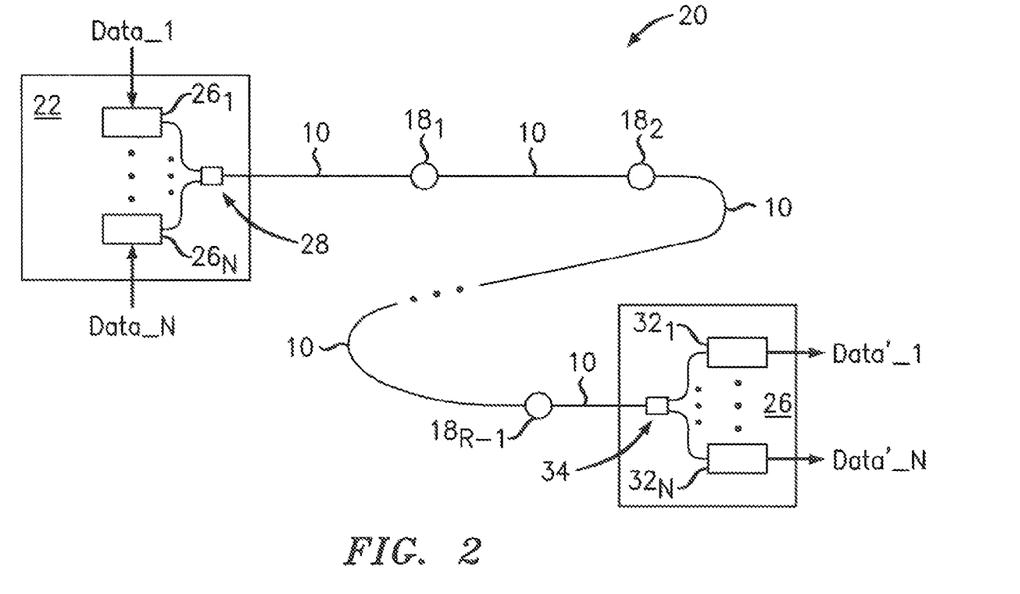
FIG. 2 is a block diagram schematically illustrating an optical communication system in which an optical channel includes a series of one or more spans of optical fiber having a plurality of multimode optical cores, e.g., spans of the optical fiber illustrated in FIG. 1 and/or FIG. 1A.

FIG. 2 illustrates an optical communication system 20 that includes an optical data transmitter 22, an optical data receiver 26, and a sequence of R span(s) of the optical fibers 10 of FIG. 1. Here, R is an integer that this equal to or greater than one. In a multi-span embodiment, the sequence of spans of the optical fiber 10 are all-optically connected via inter-span N×N optical connectors $18_1$-$18_{R-1}$, e.g., arrays of N parallel 1×1 optical connectors, N parallel optical amplifiers, N parallel optical filters, and/or N parallel optical dispersion compensators. Examples of suitable passive and active inter-span N×N optical connectors may be described in the U.S. provisional patent application 61/428,154, filed Dec. 29, 2010, by Christopher Doerr and Peter Winzer, which is incorporated herein by reference in its entirety and will be referred to as the Doerr-1 application.

The sequence of R optical fiber(s) 10 and any inter-span optical connector(s) $18_1$-$18_{R-1}$ form N disjoint, and uncoupled optical paths between the optical transmitter 22 and the optical receiver 26, i.e., N parallel and separate optical paths. When R>1, each optical core of the internal k-th optical fiber $10'_k$ end-connects via the k-th inter-span N×N optical connector $18_k$ to a corresponding one of the optical cores of the (k+1)-th optical fiber $10'_{k+1}$, i.e., the same or a different optical core of the (k+1)-th optical fiber $10'_{k\pm 1}$, thereby forming a segment of one of the N substantially uncoupled optical paths. The different optical cores $12_1$-$12_N$ are typically sufficiently laterally separated in the R optical fiber(s) 10 that optical crosstalk between the N different optical paths is negligible compared to inter-path optical crosstalk.

The optical transmitter 22 includes N optical modulators $26_1$-$26_N$ that modulate respective data streams Data_1 to Data_N onto optical carriers. Each optical modulator $26_1$-$26_N$ is optically connected to a first end of a corresponding one of the N optical cores of the first optical fiber 10 of the sequence of R span(s). Each optical modulator $26_k$ end-connects optically to the corresponding optical core $12_k$ of the first optical fiber 10, e.g., by an optional optical connector 28. The optical connector 28 may include, e.g., an optical fiber bundle whose individual optical fibers, e.g., multi-mode optical fibers, are laterally positioned to end-connect to the corresponding optical cores $12_1$-$12_N$ and whose individual optical fibers connect to the corresponding optical modulators $26_1$-$26_N$. Alternatively, the optional optical coupler 28 may include one of optical couplers described in the Doerr-1 application.

Each optical modulator $26_k$ is also configured to modulate digital data, in parallel, onto a set of optical carriers and to couple each modulated optical carrier of the set to a different linearly independent set of propagating optical modes of the optical core $12_k$ end-connected thereto. Thus, the optical modulator $26_k$ can simultaneously transmit a number of parallel and independent digital data streams by using different linearly independent sets of the propagating optical modes to carry different digital data streams. The number of such parallel-transmitted data streams is equal to or less than the number of orthogonal propagating optical modes in the corresponding optical core $12_k$.

Methods and structures for simultaneously coupling data modulated optical carriers to different linearly independent sets of propagating optical modes of a multimode optical waveguide may be, e.g., described in one or more of U.S. patent application Ser. No. 12/827,641, filed by Rene'-Jean Essiambre et al, on Jun. 30, 2010; U.S. patent application publication 20100329671; and U.S. patent application publication 2010329670, which are all incorporated herein by reference in their entirety and will be referred to as the Essiambre_1 applications. Some methods and/or structures of the Essiambre_1 applications may be suitable to connect the individual optical modulators $26_1$-$26_N$ to corresponding ones of the optical cores $12_1$-$12_N$ of to individual multi-mode optical waveguides of the optional optical coupler 28 in a manner that enables multimode transmission of optically modulated carriers there from, in parallel.

The optical receiver 26 includes N optical demodulators $32_1$-$32_N$ that demodulate received modulated optical carriers into data streams Data'_1 to Data'_N. Each optical demodulator $32_1$-$32_N$ end-connects optically to a corresponding one of the optical cores $12_1$-$12_N$ of the R-th optical fiber 10, e.g., via an optional optical coupler 34. The optical connector 34 may include, e.g., an optical fiber bundle whose individual optical fibers, e.g., multimode optical fibers, are laterally positioned to end-connect to the corresponding optical cores $12_1$-$12_N$ and whose individual optical fibers also connect to the corresponding optical demodulators $32_1$-$32_N$. Alternatively, the optional optical coupler 34 may include one of optical couplers described in the Doerr-1 application.

Each optical demodulator $32_k$ is capable of demodulating digital data from a set of modulated optical carriers and is optically connected to separate out linearly independent sets of the propagating optical modes received from the corresponding optical core $12_k$. That is, each optical demodulator $32_k$ may simultaneously receive and demodulate a number of independent digital data streams from the corresponding optical core $12_k$, wherein the number is equal to or less than the number of orthogonal propagating optical modes therein. Some of the methods and structures of the Essiambre_1 applications may be used to optically end-connect individual ones of the optical demodulators $32_1$-$32_N$ to corresponding ones of the optical cores $12_1$-$12_N$ or to the corresponding multimode optical waveguide of the optional optical coupler 34.

Figure 3:
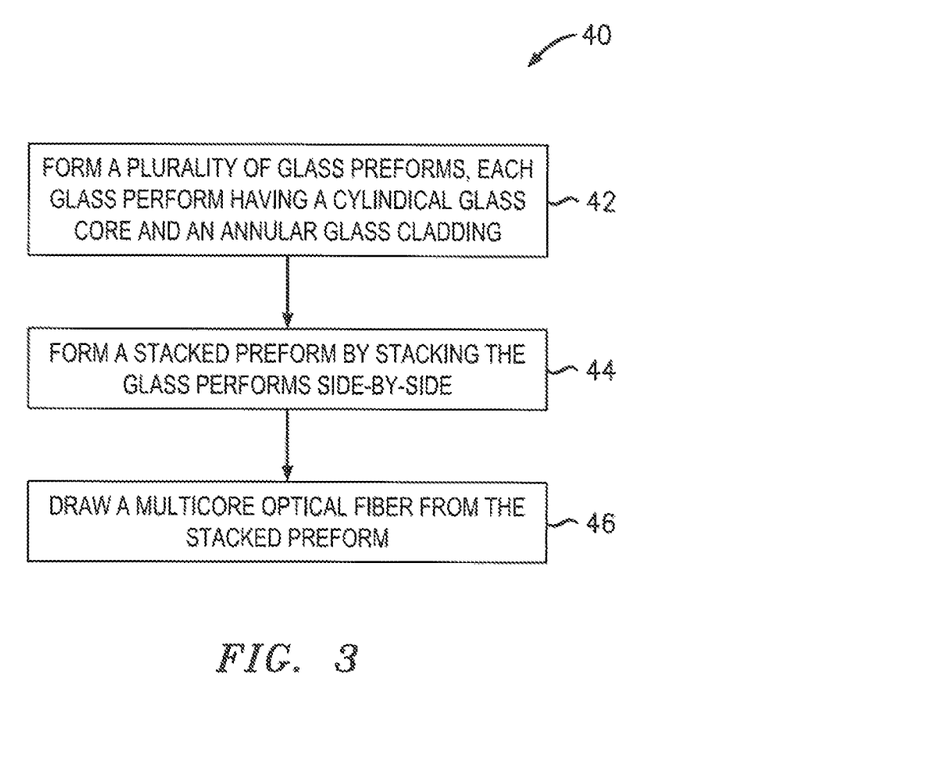
FIG. 3 schematically illustrating an embodiment of a method for fabricating a multi-core optical fiber, e.g., the multi-core optical fiber schematically illustrated in FIG. 1, 1A, or 2.

FIG. 3 schematically illustrates one example method 40 for manufacturing a multi-core optical fiber 10', e.g., the multi-core optical fibers 10, 10'' illustrated in FIGS. 1 and 2. The method 40 produces structures 52, 58, 10' schematically illustrated in FIG. 4.

Figure 4:
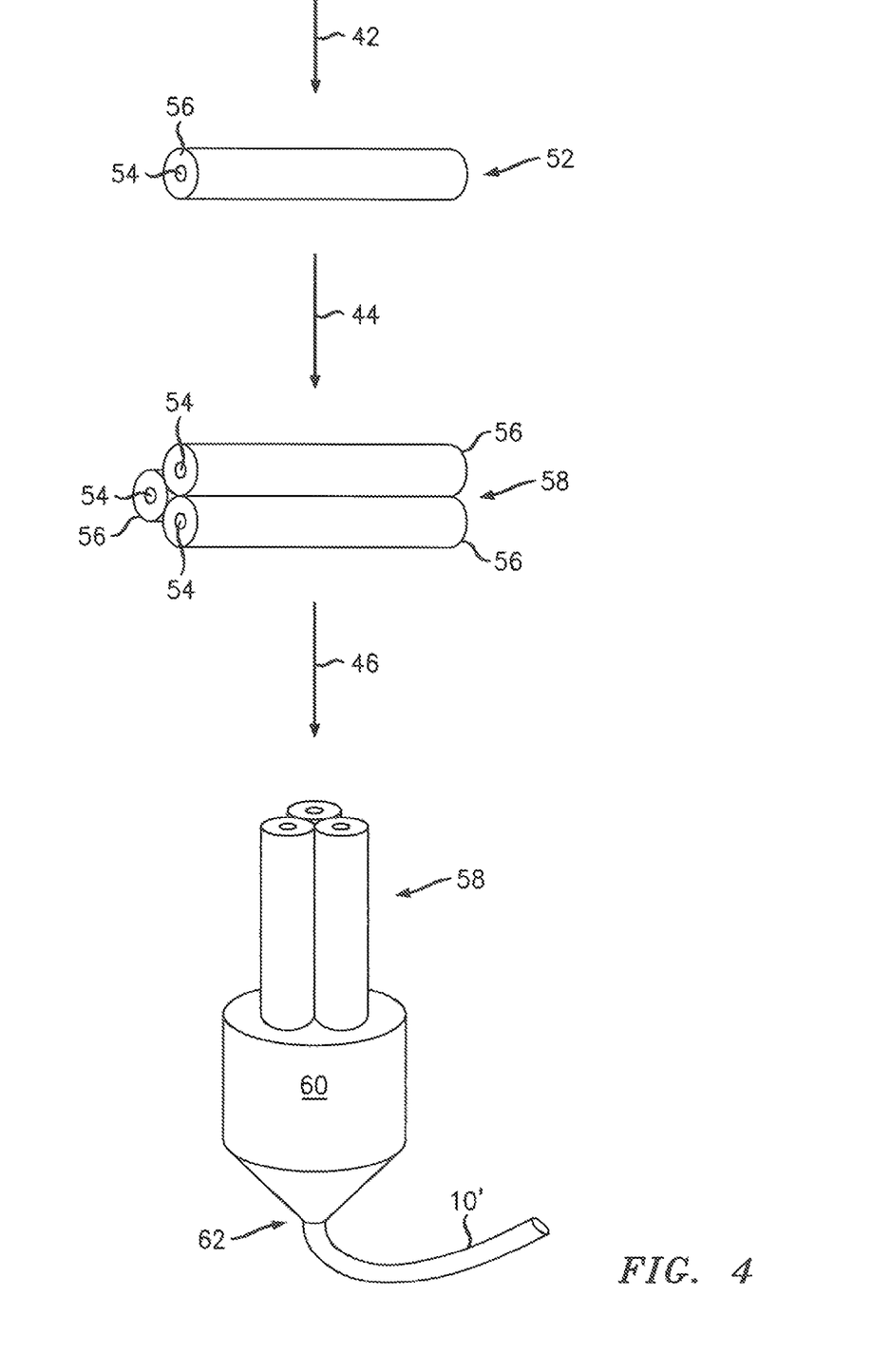
FIG. 4 schematically illustrates the fabrication of various structures that are produced during performance of the method of FIG. 3.

The method 40 includes forming a plurality of glass preforms 52 for optical fibers (step 42). Each glass preform 52 includes a cylindrical glass core 54 and an annular glass cladding 56 that is adjacent to and located around the glass core 52. The preform 52 may be fabricated based on conventional techniques for making preforms. The glass core 54 has a refractive index that may be, e.g., constant therein or may vary or decrease about as the square of the distance from the axis of the glass core 54. The glass core 54 may have, e.g., a conventionally graded refractive index profile. In the preform 52, the refractive index has a step decrease at the interface between the glass core 54 and the glass cladding 56.

The method 40 includes forming a stacked preform 58 from a plurality of the glass preforms 52 fabricated at the step 42 (step 44). In the stacked preform 58, a plurality of the glass preforms 52 are stacked side-by-side and their surfaces are in contact with each other. Such a stack may be constructed, e.g., such that the individual glass preforms 52 are fused together at their surfaces. For example, outer portions of the glass preforms 52 may be heated prior to or after stacking and then, allowed to cool in the stack structure so that outer portions of the individual glass preforms 52 fuse together. Alternately, the stack of glass preforms may be laterally and externally bound and held together, e.g., by cords, so that the individual class preforms 52 cannot move with respect to each other in the stacked preform 58.

The method 40 includes drawing a multi-core optical fiber 10', e.g., the optical fiber 10 of FIGS. 1-2, from the stacked preform 58 that was fabricated at the step 44 (step 46). To draw the multi-core optical fiber 10', one end of the stacked preform 58 is inserted into a thermal fiber-draw tower 60, e.g., a conventional thermal fiber-draw tower. The thermal fiber-draw tower 60 gradually melts an end portion of the stacked preform 58 so that the optical fiber 10' can be drawn there from via a bottom hole 62 in the thermal fiber-draw tower 60.

In the method 40, the glass preforms 52 are fabricated such that the values of the refractive indexes and the thicknesses of the glass cores 54 and the glass claddings 56 are suitable for forming a desired multi-core optical fiber 10' at the draw step 46. For example, the glass claddings 56 are selected to be thick enough so that the glass optical-cores will be widely separated in the final optical fiber 10'. Based on that design selection, there will insignificant or negligible optical crosstalk between the different ones of the optical cores of the final optical fiber 10'. In addition, the widths of the glass cores 54 and the index difference between the glass cores 54 and the glass claddings 56 are selected so that each optical core of the final optical fiber 10' will only support a small number of propagating optical modes, e.g., greater than or equal to 5 or 10 such modes and less than or equal to 70, 50, 30 or 20 such modes. Based on the present disclosure, a person of ordinary skill in the relevant arts would be able to perform the steps 42, 44, and 46 of the method 40 in a manner that would produce such suitable optical fibers 10'.

Figure 5:
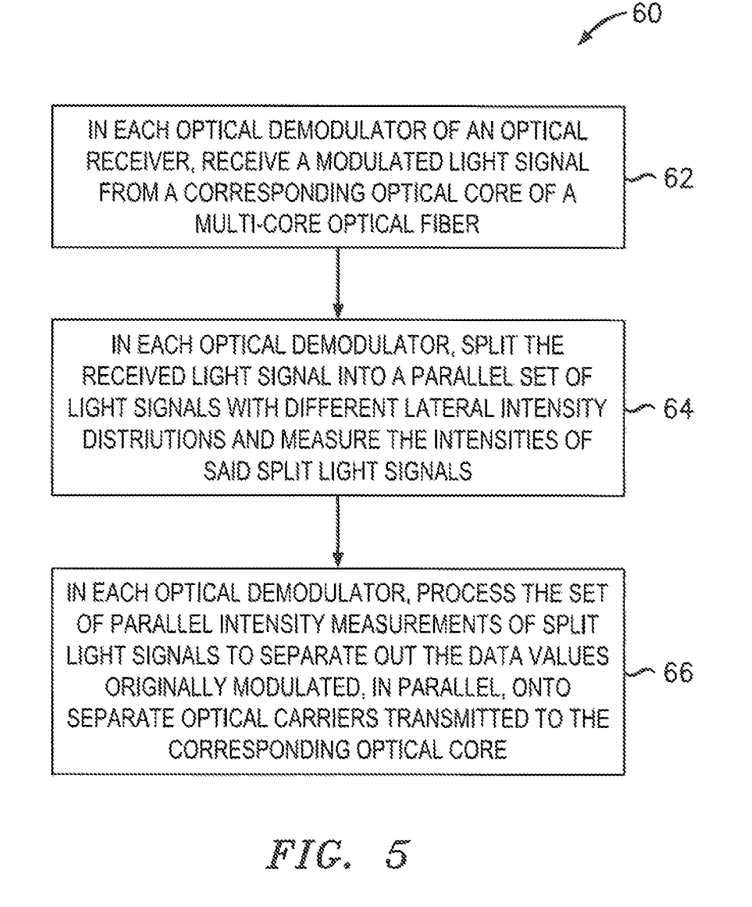
FIG. 5 is a flow chart schematically illustrating a method of operating an optical receiver, e.g., the optical receiver 20 schematically illustrated in FIG. 2.

FIG. 5 schematically illustrates a method 60 for operating an optical receiver, e.g., the optical receiver 26 schematically illustrated in FIGS. 1-2.

The method 60 includes receiving, in each optical demodulator, e.g., one of the optical demodulators $32_1$-$32_N$, a modulated light signal from a multi-core optical fiber, e.g., R-th optical fiber 10 of FIG. 2 (step 62). Each optical demodulator receives the modulated light signal from a corresponding one of the optical cores of the multi-core optical fiber, e.g., one of the optical cores $12_1$-$12_N$. That is, each optical modulator does not typically receive a significant amount of light for others of the optical cores of the multi-core optical fiber.

The method 60 includes, in each optical demodulator, splitting the received light signal received in the optical demodulator into a parallel set of separate light signals with different lateral intensity distributions and separately electrically measuring the intensities of said split light signals to produce a set of separate electrical measurements of intensities thereof (step 64). The light signals with different lateral intensity distributions correspond to different propagating modes or correspond to different independent combinations of the propagating modes. Such a set of intensity measurements is performed separately in each optical demodulator.

In each optical demodulator, the method 60 includes processing the set of parallel intensity measurements of split light signals to separate out the N data values originally modulated, in parallel, onto separate optical carriers transmitted to the corresponding optical core (step 66). That is, the processing effectively diagonalizes the channel matrix of the corresponding optical core, e.g., via equalization, to produce a set of electrical signals whose values are indicative of the original parallel set of data values transmitted to the corresponding optical core, e.g., by one of the optical modulators $26_1$-$26_N$ of the optical transmitter 22 of FIG. 2. Thus, channel matrices of the individual optical cores are diagonalized independently of each other, e.g., due to the lack of crosstalk there between. At the step 66, the processing may include using conventional BLAST, D-BLAST, V-BLAST or other techniques for diagonalizing channel matrices in multiple-input-multiple-output (MIMO) systems and for subsequently demodulating baseband data.

In the method 60, the channel matrix for each optical core, e.g., each of the optical cores $12_1$-$12_N$, is diagonalized separately. Furthermore, in each optical core, the number of propagating optical modes is not large, e.g., less than or equal to 70, 50, 30, or 20. For a multi-core optical fiber, in which each optical core only has a small number of propagating modes, it is often possible to design the optical fiber so that the differential group delay between the various propagating modes of a single core is low. For such a multi-core optical fiber, the optical demodulator of a single optical core, e.g., any of the optical demodulators $32_1$-$32_N$, may have an equalizer with a comparatively short impulse response and still be able to effectively diagonalize that optical core's channel matrix, because the channel matrix has a small size. Thus, the length of each such hardware element may not be large, and the total delay for such processing of received optical signals may not be large even when the optical fiber itself supports a large number of parallel and relatively orthogonal optical communication channels. For the above-described reasons, it may be advantageous to scale up data capacities in an optical fiber by redesigning the optical fiber to have an increased number of essentially isolated optical cores rather than by redesigning the optical fiber to have an increased number of propagating modes for individual ones of the optical cores therein.

Limiting the number of propagating optical modes per optical core can help to make optical communication systems more easily scalable with data communication rates In the optical communication system 20 of FIG. 2, the data communication rate may be increased by replacing the optical fibers 10 by optical fibers having more multimode optical cores, adding more core-by-core optical modulators to the optical transmitter 22, and adding more core-by-core optical demodulators to the optical receiver 26. Such increases of the data transmission rates of the optical communication system 20 should be achievable without the need for proportional increases in the complexity of hardware used to diagonalize channel matrices.

Figure 1A:
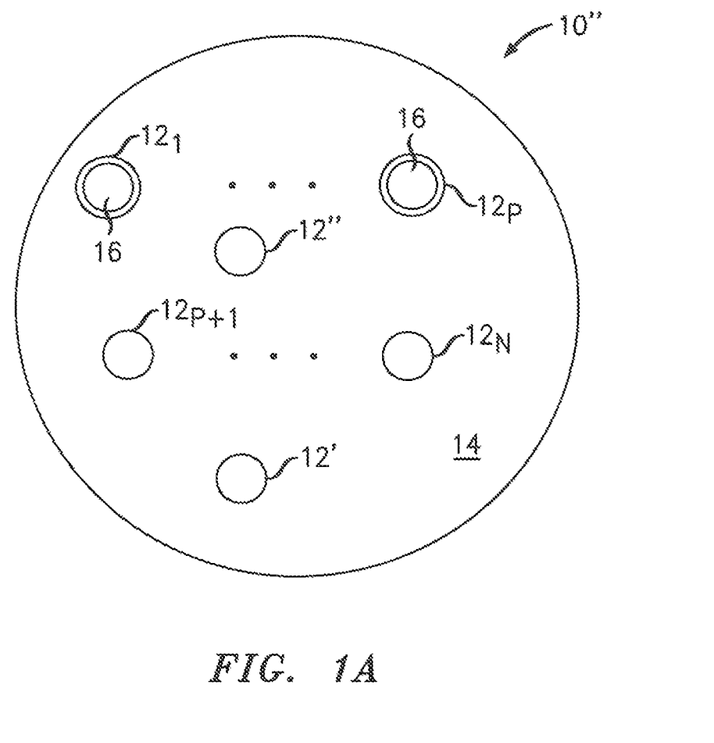
FIG. 1A is a cross-sectional view schematically illustrating an embodiment of the multi-core optical fiber of FIG. 1, in which one or more of the optical cores thereof is a tubular optical core.

FIG. 1A illustrates a specific embodiment 10" of the multi-core optical fiber 10 of FIG. 1. In the multi-core optical fiber 10", P of the N multi-mode optical cores $12_1, \ldots, 12_P$, which are located in the optical cladding 14, are tubular multi-mode optical cores, e.g., multi-mode optical cores at a wavelength in the C band, the L band, or the S band of optical telecommunications. Here, $P \geq 1$, and $P \leq N$. Each of the P tubular multi-mode optical cores $12_1$-$12_P$ has a ring-shaped cross-section. The refractive index in each tubular multi-mode optical core $12_1$-$12_P$ is larger than the refractive index in the optical cladding 14. In various embodiments, the refractive index of individual ones of the tubular multi-mode optical cores $12_1$-$12_P$ may be constant or may have a non-trivial dependency on radial distance from the axe of the individual ones of the tubular multi-mode optical core $12_1$-$12_P$.

In some such embodiments, one or more of the P tubular multimode optical cores $12_1$-$12_P$ also include(s) an optional inner optical cladding 16 filling the interior(s) thereof. Each such optional inner optical cladding 16 has a refractive index, which is smaller than the refractive index in the surrounding tubular multi-mode optical core $12_1$-$12_P$.

In some embodiments, the multi-core optical fiber 10" may also include one or more other solid multi-mode optical cores $12_{P+1}$-$12_N$ and/or may also include one or more single-mode solid optical cores 12', 12" located in the optical cladding 14.

The present application incorporates by reference herein, in their entirety, U.S. patent application 13/041366, which was filed on Mar. 5, 2011; U.S. patent application 13/041366, which was filed on Mar. 5, 2011; and the U.S. provisional patent application titled "OPTICAL FIBERS WITH TUBULAR OPTICAL CORES", by Christopher Doerr and Peter J. Winzer, which was filed on Mar. 5, 2011. One or more of the three patent applications, which are mentioned in this paragraph, may describe methods and/or structures that a skilled person would understand, i.e., based on the present description, to be suitable for making and/or using examples of the multi-core optical fiber 10" of FIG. 1A.

The Detailed Description of the Illustrative Embodiments and drawings merely illustrate the principles of the invention. It will thus be appreciated that those skilled in the art will be able to devise various arrangements that, although not explicitly described or shown herein, embody the principles of the inventions and are included within the claimed inventions. Furthermore, all examples recited herein are principally intended to be only for pedagogical purposes to aid in understanding the principles of the inventions and concepts contributed by the inventor to furthering the art, and are to be construed as being without limitation to such specifically recited examples and conditions. Moreover, all statements herein reciting principles, aspects, and embodiments of the inventions, as well as specific examples thereof, are intended to encompass equivalents thereof.

What is claimed is:

1. An apparatus, comprising:
an optical fiber having a plurality of optical cores therein, each optical core being located lateral in the optical fiber to the remaining one or more optical cores and being able to support a number of propagating optical modes at telecommunications wavelengths, each number being less than or equal to seventy.

2. The apparatus of claim 1, wherein each number is less than or equal to thirty and greater than or equal to five.

3. The apparatus of claim 2, wherein each number is less than or equal to twenty.

4. The apparatus of claim 1, wherein each number is greater than or equal to five.

5. The apparatus of claim 1, wherein optical cross-talk between the optical cores is insubstantial over the length of the optical fiber.

6. The apparatus of claim 1, wherein an average lateral separation of the optical cores is at least as large as thirty micro-meters.

7. The apparatus of claim 6, wherein each number is greater than or equal to five and less than or equal to thirty.

8. The apparatus of claim 1, wherein one of the optical cores of the plurality of optical cores is a tubular optical core.

9. The apparatus of claim 8, wherein the tubular optical core is a multi-mode optical core at a wavelength in one of the C band, the L band, and the S band of optical telecommunications.

10. An apparatus comprising:
an optical communication device having one of an optical transmitter with a plurality of optical data modulators and an optical receiver with a plurality of optical data demodulators; and
a sequence of one or more spans of optical fiber, the sequence being optically connected at one end to the optical transmitter or receiver; and
wherein each optical fiber of the sequence has three or more optical cores, each optical core is able to support a number of propagating optical modes at telecommunications wavelengths, and each number is less than or equal to fifty.

11. The apparatus of claim 10, wherein each optical data modulator or data demodulator of the optical communication device end connects to a corresponding one of the optical cores.

12. The apparatus of claim 11, wherein each optical data modulator or data demodulator is configured to communicate, in parallel, via a plurality of different sets of the propagating optical modes of the corresponding one of the optical cores.

13. The apparatus of claim 11, wherein the communication device is configured to compensate for optical crosstalk on the individual optical cores without compensating for optical crosstalk between the optical cores.

14. The apparatus of claim 12, wherein each number is less than or equal to thirty and greater than or equal to five.

15. The apparatus of claim 12, wherein optical cross-talk between the optical cores is insubstantial over the length of the optical fiber.

16. The apparatus of claim 12, wherein an average lateral separation of the optical cores is at least as large as thirty micro-meters.

17. The apparatus of claim 16, wherein each number is greater than or equal to five and less than or equal to thirty.

18. The apparatus of claim 10, wherein one of the optical cores of the three or more optical cores is a tubular optical core.

19. The apparatus of claim 18, wherein the tubular optical core is a multi-mode optical core at a wavelength in one of the C band, the L band, and the S band of optical telecommunications.

* * * * *